United States Patent [19]

Numazawa et al.

[11] Patent Number: 5,174,604
[45] Date of Patent: Dec. 29, 1992

[54] WEBBING RETRACTOR

[75] Inventors: Akio Numazawa; Tatsushi Kubota; Hironori Sasaki, all of Aichi, Japan

[73] Assignee: Kabushiki Kaisha Tokai-Rika-Denki-Seisakusho, Aichi, Japan

[21] Appl. No.: 743,938

[22] Filed: Aug. 12, 1991

[30] Foreign Application Priority Data

Aug. 31, 1990 [JP] Japan .............................. 2-91833[U]

[51] Int. Cl.⁵ .............................................. B60R 22/42
[52] U.S. Cl. ................................... 280/806; 297/478; 242/107.2
[58] Field of Search ................. 280/806, 807; 297/478, 297/480; 242/107.2; 188/65.1

[56] References Cited

U.S. PATENT DOCUMENTS

| | | | |
|---|---|---|---|
| 4,420,126 | 12/1983 | Ando | 188/65.1 |
| 4,422,593 | 12/1983 | Takada | 280/806 |
| 4,667,894 | 5/1987 | Izuchi et al. | 242/107.2 |
| 4,687,253 | 8/1987 | Ernst | 280/806 |
| 5,029,770 | 7/1991 | Tanaka | 242/107.2 |

FOREIGN PATENT DOCUMENTS 61-205532  9/1986  Japan .

Primary Examiner—Karin L. Tyson
Attorney, Agent, or Firm—Sixbey, Friedman, Leedom & Ferguson

[57] ABSTRACT

A webbing retractor for taking up an occupant-restraining webbing used in a seat belt apparatus for a vehicle has a takeup shaft held by a frame, and the webbing is wound around the takeup shaft. The takeup shaft is pivotally held at a substantially intermediate portion of each of a pair of arms. One end of each arm is pivotally supported by a support shaft, and the arms are adapted to rotate about the support shaft. At the time of a sudden deceleration of the vehicle, a clamp plate held at a distal end of a clamp lever is pushed upward by an actuating device including the arms to cause the webbing to be clamped, and when a clamping force exceeding a predetermined value is applied to the webbing, a projection formed at a proximal end of the clamp lever presses a thin-walled portion toward a rectangular hole so as to deform the thin-walled portion, which in turn causes the clamp plate to move in a direction in which the clamped state of the webbing is canceled, thereby setting a webbing-clamping force at a predetermined level or below.

20 Claims, 3 Drawing Sheets

WEBBING RETRACTOR

BACKGROUND OF THE INVENTION

1. Field of the Invention

The present invention relates to a webbing retractor for taking up an occupant-restraining webbing used in a seat belt apparatus for a vehicle.

2. Description of the Related Art

A webbing retractor for taking up an occupant-restraining webbing onto a takeup shaft in the form of a roll is so designed as to allow the occupant to pull out the webbing out of the webbing retractor so as to cause the webbing to be applied around the occupant.

A webbing retractor has been proposed which is so arranged that, at the time of a sudden deceleration of a vehicle, the rotation of the takeup shaft in a webbing pulling-out direction is prevented by a takeup-shaft locking mechanism, and a clamping means is actuated to clamp and lock an intermediate portion of the webbing so that a tensile force will not act on the portion of the webbing wound around the takeup shaft, thereby preventing the tight winding of the webbing (Japanese Patent Application Laid-Open No. 61-205532).

With such a webbing retractor, however, since the webbing may become damaged if a clamping force exceeding a predetermined level is applied to the webbing by the clamping means, the webbing needs to be reinforced further, or a complicated clamped-state canceling mechanism must be provided for restricting a webbing-clamping force so that a load more than is necessary will not act on the portion of the webbing being clamped.

SUMMARY OF THE INVENTION

In view of the above-described circumstances, it is an object of the present invention to provide a webbing retractor having a simple structure for canceling a clamped and locked state of the webbing under a predetermined load at the time of a sudden deceleration of a vehicle.

To this end, according to the present invention, a webbing retractor for tacking up an occupant-restraining webbing used in a seat belt apparatus for a vehicle has a takeup shaft held by a frame, and the webbing is wound around the takeup shaft. A clamping means is pivotally supported by a supporting means and is disposed in such a manner as to be capable of clamping an intermediate portion of the webbing pulled out of the takeup shaft. At the time of a sudden deceleration of the vehicle, an actuating means causes the clamping means to move in a webbing-clamping direction, and when a clamping force exceeding a predetermined value is applied to the webbing, a deforming portion provided in the clamping means undergoes deformation, thereby causing the clamping means to move in a direction in which the clamped state of the webbing is canceled.

With the webbing retractor arranged as described above, when a tensile force of the webbing reaches a predetermined value at the time of a sudden deceleration of the vehicle, a force corresponding to the webbing-clamping force acts between a shaft and a deforming portion, so that the deforming portion undergoes deformation and is displaced in the direction in which the clamped state is canceled, thereby reducing the webbing-clamping force of the clamping means. As a result, the clamped state of the webbing is canceled, and the load acting on the portion of the webbing clamped is restricted to a predetermined value. Thus, in the present invention, no special component parts for cancelling the clamped state of the webbing are additionally required, and the clamped and locked state of the webbing can be canceled under a predetermined load simply by altering the structure of a component part of a clamping and locking mechanism.

DESCRIPTION OF THE PREFERRED EMBODIMENT

Figure 1:
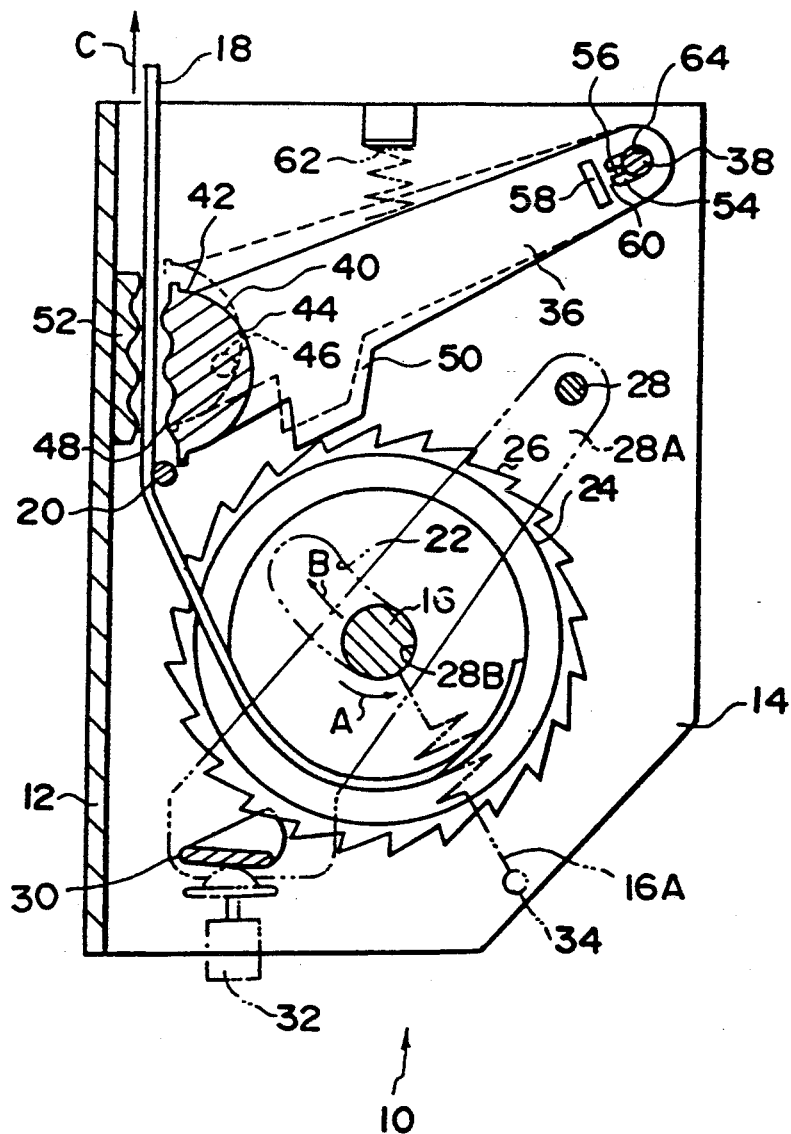
FIG. 1 is a cross-sectional view of a webbing retractor 10 in accordance with the present invention.

FIG. 1 illustrates a webbing retractor 10 in accordance with the present invention.

As shown in FIG. 1, the webbing retractor 10 includes a frame 12 secured to a vehicle, and the frame 12 has a pair of leg plates 14 (only one is shown in FIG. 1) formed by orthogonally bending the frame 12 at opposite sides thereof in parallel with each other. A takeup shaft 16 is pivotally supported by the leg plates 14, and one longitudinal end portion of a webbing 18 is wound around an axially intermediate portion of the takeup shaft 16 in the form of a roll, the other end portion of the webbing 18 being led upward along the frame 12.

A guide pin 20 for guiding the webbing is provided in such a manner as to extend between the leg plates 14. The guide pin 20 allows the webbing 18 to be stretched in a fixed state in parallel with the frame 12 irrespective of the relative amount of the webbing 18 taken up on the takeup shaft 16.

A bearing hole 22 for bearing the takeup shaft, which is an elongated hole allowing the takeup shaft 16 to move diagonally, is provided in each of the leg plates 14. The bearing holes 22 constitute an actuating means.

One end of the takeup shaft 16 protruding from the leg plate 14 is retained at an inner end of an unillustrated spiral spring serving as a takeup means, while an outer end of the spiral spring is retained at an unillustrated spring case secured to the leg plate 14.

The takeup shaft 16 is urged and rotated by the urging force of this spiral spring in a webbing taking-up direction (in the direction of arrow A in FIG. 1), and is adapted to be rotatable in a webbing pulling-out direction (in an opposite direction to the direction of arrow A in FIG. 1) against the urging force of the spiral spring.

A pair of disk-shaped spools 24 are respectively provided on opposite sides of the portion of the takeup shaft 16 where the webbing 18 is wound, and the taking-up position of the webbing 18 is restricted by these spools 24. The spools 24 are adapted to move diagonally upward (in the direction of arrow B in FIG. 1) together with the takeup shaft 16 along the bearing hole 22.

A ratchet wheel 26 and a tensile coil spring 16A are attached to a respective portion of the takeup shaft 16 projecting from an outer wall of each of the spools 24. Each ratchet wheel 26 is coaxially secured to the takeup shaft 16 between the spool 24 and the leg plate 14, and is adapted to rotate integrally with the takeup shaft 16.

A lock lever 30 is provided in correspondence with the ratchet wheels 26. The lock lever 30 is disposed in such a manner as to extend between distal end portions of a pair of arms 28A pivotally supported by a support shaft 28 extending between the leg plates 14. The lock lever 30 is arranged to mesh with the ratchet wheels 26 as a pendulum 32 serving as an acceleration sensor swings, so as to prevent the rotation of the takeup shaft 16 in the webbing pulling-out direction (in the direction opposite arrow A in FIG. 1).

Provided in a longitudinally intermediate portion of the arm 28A is an interlocking hole 28B, into which a portion of the takeup shaft 16 between the spool 24 and the leg plate 14 is fitted loosely so as to allow the lock lever 30 to move in conjunction with the movement of the takeup shaft 16.

On end of the tensile coil spring 16A is pivotally supported at an end of the takeup shaft 16 on the outer side of the leg plate 14, while the other end of the tensile coil spring 16A is retained by the leg plate 14 via a pin 34 disposed diagonally below the takeup shaft 16. The takeup shaft 16 is held at a lower end of the bearing hole 22 by means of the urging force of the tensile coil spring 16A, and is adapted to be movable together with the lock lever 30 along the bearing hole 22 against the urging force of the tensile coil spring 16A.

Above the takeup shaft 16, a clamp lever 36 serving as a part of a clamping means is pivotally supported on a support means or shaft 38 extending between the leg plates 14. The clamp lever 36 has a pair of projecting portions 50 projecting from opposite sides thereof toward the respective spools 16. The arrangement provided is such that the spools 24 moving along the respective bearing holes 22 abut against the projecting portions 50, thereby causing the clamp lever 36 to swing about the shaft 38. The shaft 38 is pivotally supported by the leg plates 14 at a position where the clamp lever 36 swung by the spools 24 can be moved in the webbing-clamping direction and can be pressed toward the webbing 18.

As shown in FIG. 1, the clamp lever 36 is pivotally supported on the shaft 38 which is inserted in a substantially rectangular bearing hole 54 provided in the clamp lever 36 and constituting a deforming portion. An inner peripheral portion of the bearing hole 54 away from the webbing is formed as an arcuate portion 64 having a configuration conforming to the outer peripheral surface of the shaft 38, while a projection 56 projects from an inner peripheral portion of the bearing hole 54 close to the webbing, the shaft 38 being supported by the projection 56 and the arcuate portion 64.

A rectangular hole 58 is formed in a transversely intermediate portion of the clamp lever 36 adjacent the webbing 18 side of the bearing hole 54, and a portion between the bearing hole 54 and the rectangular hole 58 is formed as a thin-walled portion 60. As the projection 56 is pressed toward the rectangular hole 58 by the shaft 38, the thin-walled portion undergoes deformation and is capable of projecting into the rectangular hole 58 together with the projection 56.

A clamp plate 42 is accommodated in a distal end portion of the clamp lever 36. The clamp plate 42 has a convex portion 44 formed thereon, and the convex portion 44 is accommodated in a concave portion 40 formed at the distal end portion of the clamp lever 36.

The clamp plate 42 is arranged such that each of a pair of pins respectively formed at opposite side portions of the clamp plate 42 is pivotally supported by one end of an unillustrated wire spring, the other end of the wire spring being retained at the shaft 38. The clamp plate 42 is held by the clamp lever 36 in a state in which the clamp plate 42 is urged toward the shaft 38 by the wire spring.

The clamp plate 42 and the clamp lever 36 constitute the clamping means and serve to clamp the webbing 18 between the clamp plate 42 and the frame 12.

The surface of the clamp plate 42 opposing the longitudinally intermediate portion of the webbing 18 is formed as a corrugated clamping portion 48. In addition, a securing portion 52 is disposed on the frame 12 in correspondence with the clamping portion 48. The securing portion 52 is formed in a corrugated configuration corresponding to the clamping portion 48, and is fixed to the frame 12. The webbing 18 is clamped by the clamping portion 48 and the securing portion 52.

Figure 2:
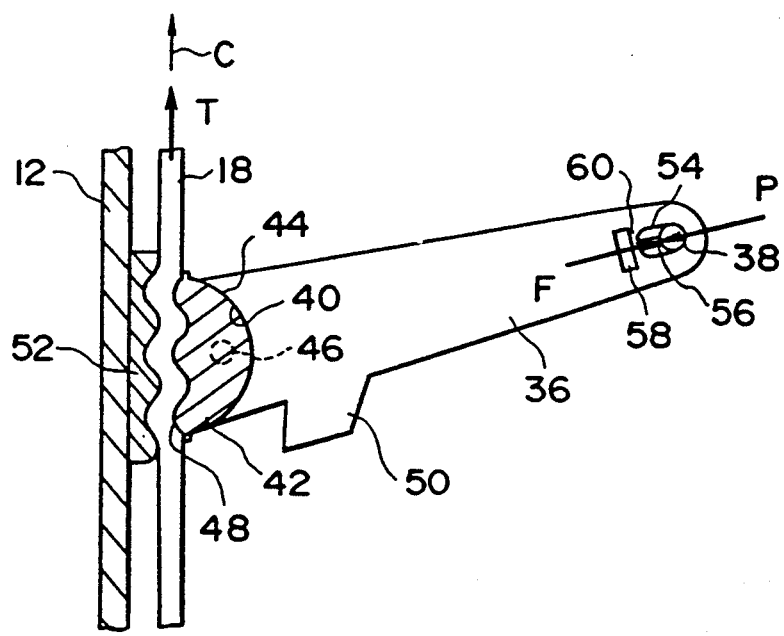
FIG. 2 is a cross-sectional view of essential portions, illustrating the webbing retractor 10 in a clamped and locked state.

As shown in FIG. 2, at the time when the webbing 18 is clamped, a clamping and locking force exerted by the clamping portion 48 and the securing portion 52 is produced as the clamping portion 48 presses with a pressing force P. In addition, this pressing force P and a reactionary force F act between the shaft 38 and the projection 56. The arrangement provided is such that the pressing force P and the reactionary force F increase with an increase in a tensile force T acting on the webbing.

In addition, a compression coil spring 62 serving as an urging means is provided so as to set the clamp plate 42 in a state of being spaced apart from the intermediate portion of the webbing, i.e., to set the clamp lever 36 in a state of being rotated counterclockwise as viewed in FIG. 1.

In a case where the webbing retractor 10 is used for a three-point seat belt apparatus of a continuous webbing type, the other end of the webbing 18 paid out of the takeup shaft 16 is retained by a chassis via an unillustrated anchor member, an intermediate portion of the webbing 18 is folded back at an unillustrated slip joint retained by the chassis, and an unillustrated tongue plate is fitted to the intermediate portion of the webbing 18 in such a manner as to be slidable in the longitudinal direction of the webbing.

A description will now be given of the operation of this embodiment.

FIG. 1 shows the webbing retractor 10 in a normal state in which the webbing 18 is worn by the occupant.

As the occupant seated in the seat pulls the webbing 18 out of the takeup shaft 16 and engages the unillustrated tongue plate with a buckle device disposed on the chassis, the occupant assumes a webbing-applied state.

In this state, the takeup shaft 16 is located at the lower end of the bearing hole 22 by being urged by the tensile coil spring 16A. The takeup shaft 16 in this state is capable of allowing the webbing 18 to be pulled out against the urging force of the unillustrated spiral spring.

At the time of a sudden deceleration of the vehicle, the pendulum 32, i.e., the acceleration sensor or actuating means, is actuated, which in turn causes the lock lever 30 to mesh with the ratchet wheels 26, thereby preventing the rotation of the takeup shaft 16 in the webbing pulling-out direction.

At approximately the same time, the body of the occupant tends to move relatively in the forward direction of the vehicle owing to inertia, so that a large tensile force (a force acting in the direction of arrow C in FIG. 1) acts on the webbing 18. However, since the rotation of the takeup shaft 16 in the webbing pulling-out direction is prevented. the takeup shaft 16 is pulled toward the webbing 18 against the urging force of the tensile coil spring 16A, and moves diagonally upward (in the direction of arrow B in FIG. 1) along the bearing hole 22. In addition, the lock lever 30 moves meshed with the ratchet wheel by means of the arms 28A, and the takeup shaft 16 maintains the state in which its rotation in the webbing pulling-out direction is prevented.

As the takeup shaft 16 is moved diagonally upward, the spools 24 also move integrally therewith, and when the spools 24 are brought into contact with the respective projecting portions 50 and push the clamp lever 36 upward, the spools 24 cause the clamp lever 36 to swing about the shaft 38. As a result, the clamp plate 42 approaches the webbing 18 and is swung about the pin 46, so that the clamping portion 48 clamps the webbing 18 in cooperation with the securing portion 52 and sets the webbing 18 in a locked state (see FIG. 2).

As the webbing 18 is clamped and locked, the tight winding thereof around the takeup shaft 16 does not occur, and the amount of the webbing 18 paid out is reduced at the time of a sudden deceleration of the vehicle.

Figure 3:
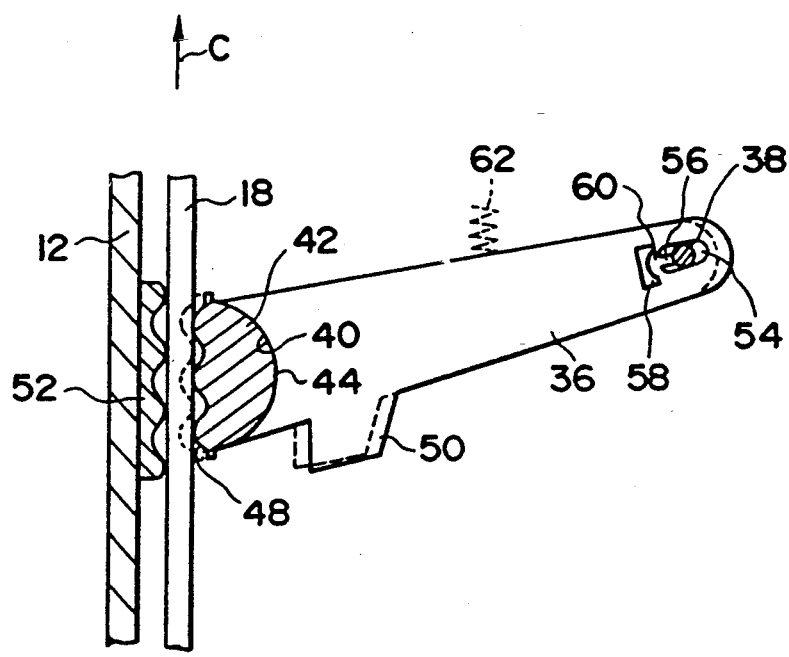
FIG. 3 is a cross-sectional view of the essential portions, illustrating the operation of canceling the clamped state.

At this juncture, when the tensile force T of the webbing 18 reaches a predetermined value, the pressing force P and the reactionary force F corresponding to the clamping and locking force occur between the shaft 38 and the projection 56. As a result, as shown in FIG. 3. the projection 56 together with the thin-walled portion 60 is deformed and displaced into the rectangular hole 58, so that the clamp lever 36 and the clamp plate 42 move in the direction in which the clamped and locked state of the webbing 18 is canceled, with respect to the shaft 38.

Consequently, the clamped and locked state of the webbing 18 due to the clamp lever 36 and the clamp plate 42 is canceled, with the result that a load exceeding a predetermined value is prevented from acting on the clamped portion of the webbing 18. In addition, since the rotation of the takeup shaft 16 in the webbing pulling-out direction is prevented, the occupant is maintained in the state of being restricted by the webbing 18.

In this embodiment, the thin-walled portion 60 is arranged to be deformed and displaced into the rectangular hole 58 as the projection 56 is pressed by the shaft 38, and the deformation strength can be set freely by varying the size of the thin-walled portion 60. Accordingly, it is possible to cancel the clamped and locked state of the webbing without providing additional component parts.

In the above-described embodiment, the thin-walled portion 60 may be arranged to become not only deformed but also partially or wholly broken with respect to the clamp lever 36 thereby setting the deformation strength of the deforming means.

As described above, at the time of a sudden deceleration of the vehicle, the webbing retractor in accordance with the present invention makes it possible to prevent the tight winding of the webbing taken up onto the takeup shaft in the form of a roll and to reduce the amount of the webbing paid out by clamping and locking the webbing. In addition, when the tensile force of the webbing reaches a predetermined amount, the deforming portion provided in the clamping means is deformed and displaced in the direction in which the clamped and locked state is canceled, with the result that the clamping means moves in the direction of canceling the clamped and locked state of the webbing. Accordingly, the clamped and locked state of the webbing is canceled, so that it is possible to prevent a load more than is necessary from being applied to the webbing.

What is claimed is:

1. A webbing retractor comprising:
   a frame secured to a chassis of a vehicle;
   a takeup shaft supported on said frame, a webbing being wound around said takeup shaft;
   clamping means for clamping an intermediate portion of the webbing pulled out of said takeup shaft;
   supporting means for pivotally supporting said clamping means to said frame including an outer circumference;
   actuating means for moving said clamping means in a webbing-clamping direction at the time of a sudden deceleration of the vehicle; and
   deforming means disposed in said clamping means provided in proximity of the outer circumference of said supporting means and adapted to undergo deformation upon application by said clamping means and of a clamping force exceeding a predetermined value to the webbing at the time of the sudden deceleration of the vehicle, so as to allow said clamping means to be pushed and deformed by the supporting means when moved in a direction in which a clamped state of the webbing is cancelled.

2. A webbing retractor according to claim 1, wherein said clamping means has a clamping lever, said supporting means being disposed at one end thereof, said clamping means being swingable about said supporting member, and said clamping means having a webbing clamping member at another end thereof to clamp the webbing.

3. A webbing tractor comprising:
   a frame secured to a chassis of a vehicle;
   a takeup shaft supported on said frame, a webbing being wound around said takeup shaft;
   clamping means for clamping an intermediate portion of the webbing pulled out of said takeup shaft;
   supporting means for pivotally supporting said clamping means to said frame;
   actuating means for moving said clamping means in a webbing-clamping direction at the time of a sudden deceleration of the vehicle; and
   deforming means disposed in said clamping means and adapted to undergo deformation upon application by said clamping means of a clamping force exceeding a predetermined value to the webbing at the time of the sudden deceleration of the vehicle, so as to allow said clamping means to move in a direction in which a clamped state of the webbing is canceled, wherein said deforming means has a thin-walled portion proximate with said supporting means and which undergoes deformation by being pressed by said supporting means when a load exceeding a predetermined value is applied to said clamping means.

4. A webbing retractor according to claim 3, wherein said deforming means has a projection abutting against said supporting means and pivotally supports said supporting means until a load exceeding a predetermined value is applied to said clamping means.

5. A webbing retractor according to claim 3, wherein said deforming means has a gap portion disposed on a side of said thin-walled portion which is remote from a side thereof opposing said supporting means, and said thin-walled portion undergoing deformation upon application of the load exceeding the predetermined value to said clamping means projects into said gap portion.

6. A webbing retractor according to claim 1, wherein said deforming means has a thin-walled portion capable of setting a deformation strength by the thickness of said thin walled portion to which a load is applied.

7. A webbing retractor according to claim 3, wherein said thin-walled portion undergoes plastic deformation upon application of a predetermined load thereto by a projection provided in said deforming means, thereby allowing said webbing clamping a projection provided in said deforming means to cancel the clamped state of the webbing.

8. A webbing retractor according to claim 3, wherein said thin-walled portion undergoes breakage upon application of a predetermined load thereto by a projection provided in said deforming means, thereby allowing said webbing clamping member provided in said clamping means to cancel the clamped state of the webbing.

9. A webbing retractor according to claim 1, wherein said actuating means has an arm member, said takeup shaft being rotatably supported by said arm member, and said arm and said takeup shaft are swingable with respect to said frame.

10. A webbing retractor according to claim 9, wherein said arm member has a takeup shaft-fixing member at one end thereof for preventing the rotation of said takeup shaft at the time of the sudden deceleration of the vehicle and has a support shaft at another end thereof, said takeup shaft-fixing member and said takeup shaft being adapted to swing about said support shaft in the same direction at the time of the sudden deceleration of the vehicle.

11. A webbing retractor comprising:
a frame secured to a chassis of a vehicle;
a takeup shaft supported on said frame, a webbing being wound around said takeup shaft;
clamping means for clamping an intermediate portion of the webbing pulled out of said takeup shaft;
supporting means for pivotally supporting said clamping means to said frame;
actuating means for moving said clamping means in a webbing-clamping direction at the time of a sudden deceleration of the vehicle; and
deforming means disposed in said clamping means and including a projection abutting against said supporting means, a thin-walled portion, and a gap portion, wherein said thin-walled portion pressed by said projection undergoes deformation and projects into said gap portion upon application of a force exceeding a predetermined value to said clamping means at the time of the sudden deceleration of the vehicle.

12. A webbing retractor according to claim 11, wherein said clamping means has a clamping lever, said supporting means being disposed at one end thereof, said clamping means being swingable about said supporting member, and said clamping means having a webbing clamping member at another end thereof to clamp the webbing.

13. A webbing retractor according to claim 11, wherein said deforming means has a thin-walled portion capable of setting a deformation strength by varying the thickness of said thin walled portion to which a load is applied.

14. A webbing retractor according to claim 11, wherein said thin-walled portion undergoes plastic deformation upon application of a predetermined load thereto by said projection, thereby allowing said webbing clamping portion to cancel the clamped state of the webbing.

15. A webbing retractor according to claim 11, wherein said thin-walled portion undergoes breakage upon application of a predetermined load thereto by said projection, thereby allowing said webbing clamping portion to cancel the clamped state of the webbing.

16. A webbing retractor according to claim 11, wherein said actuating means has an arm member, said takeup shaft being rotatably supported by said arm member, said arm and said takeup shaft being swingable with respect to said frame, and wherein said arm member has a takeup shaft-fixing member at one end thereof for preventing the rotation of said takeup shaft at the time of the sudden deceleration of the vehicle and has a support shaft at another end thereof, said takeup shaft-fixing member and said takeup shaft being adapted to swing about said support shaft in the same direction at the time of the sudden deceleration of the vehicle.

17. A locking device for locking an intermediate portion of a webbing pulled out of a webbing retractor, comprising:
clamping means having a clamp lever provided with a webbing clamping portion at one end thereof, said clamping means being adapted to clamp an intermediate portion of the webbing;
supporting means for supporting said clamping means to a frame of said webbing retractor rotatably about said supporting means;
actuating means for moving said clamping means in a webbing-clamping direction at the time of a sudden deceleration of the vehicle; and
deforming means disposed in said clamping means and including a projection abutting against said supporting means, a gap portion, and a thin walled portion adapted to undergo deformation upon application of a load thereto by said projection disposed adjacent to said thin-walled portion, wherein said thin-walled portion undergoes deformation and projects into said gap portion upon application of a force exceeding a predetermined value to said clamping means at the time of the sudden deceleration of the vehicle.

18. A locking device according to claim 17, wherein said thin-walled portion undergoes plastic deformation upon application of a predetermined load thereto by said projection, thereby allowing said webbing clamping portion to cancel the clamped state of the webbing.

19. A locking device according to claim 17, wherein said thin-walled portion undergoes breakage upon application of a predetermined load thereto by said projection, thereby allowing said webbing clamping portion to cancel the clamped state of the webbing.

20. A locking device according to claim 17, wherein said actuating means has clamp-lever pressing means for pressing said clamp lever at the time of the sudden deceleration of the vehicle so as to move said clamp lever in a webbing-clamping direction.

* * * * *